United States Patent [19]

Weitzman

[11] Patent Number: 4,648,779
[45] Date of Patent: Mar. 10, 1987

[54] AIR TABLE WITH SELECTIVE AIR DISTRIBUTION

[75] Inventor: Harry L. Weitzman, White Plains, N.Y.

[73] Assignee: Jack J. Weitzman, Spring Valley, N.Y.

[21] Appl. No.: 747,766

[22] Filed: Jun. 24, 1985

[51] Int. Cl.$^4$ .................. B65G 51/03; B25G 35/00
[52] U.S. Cl. .................................... 414/676; 83/451; 406/88
[58] Field of Search .............................. 406/88, 89, 95; 83/925 CC, 451, 374; 414/676

[56] References Cited

U.S. PATENT DOCUMENTS

| | | | |
|---|---|---|---|
| 3,056,632 | 10/1962 | Isler | 406/89 |
| 3,295,896 | 1/1967 | Hurtig et al. | 406/95 X |
| 3,598,006 | 8/1971 | Gerber et al. | 83/451 X |
| 3,730,634 | 5/1973 | Gerber et al. | 83/925 CC |
| 4,371,309 | 2/1983 | Principe et al. | 406/88 X |

Primary Examiner—Jeffrey V. Nase
Attorney, Agent, or Firm—Charles R. Rhodes; Judith E. Garmon

[57] ABSTRACT

An air distribution system for air tables of the type in which modular table sections each have a plurality of holes in the surface thereof leading to or from a plenum underneath. A plurality of manifolds each receives a supply of air from a central blower from which the air is delivered through separate air feed lines to the plenums of a corresponding set or group of sections. The air from the blower to each manifold is selectively controlled by an on-off valve so that a selected set of modular sections may obtain its air supply separately from the other sets.

2 Claims, 2 Drawing Figures

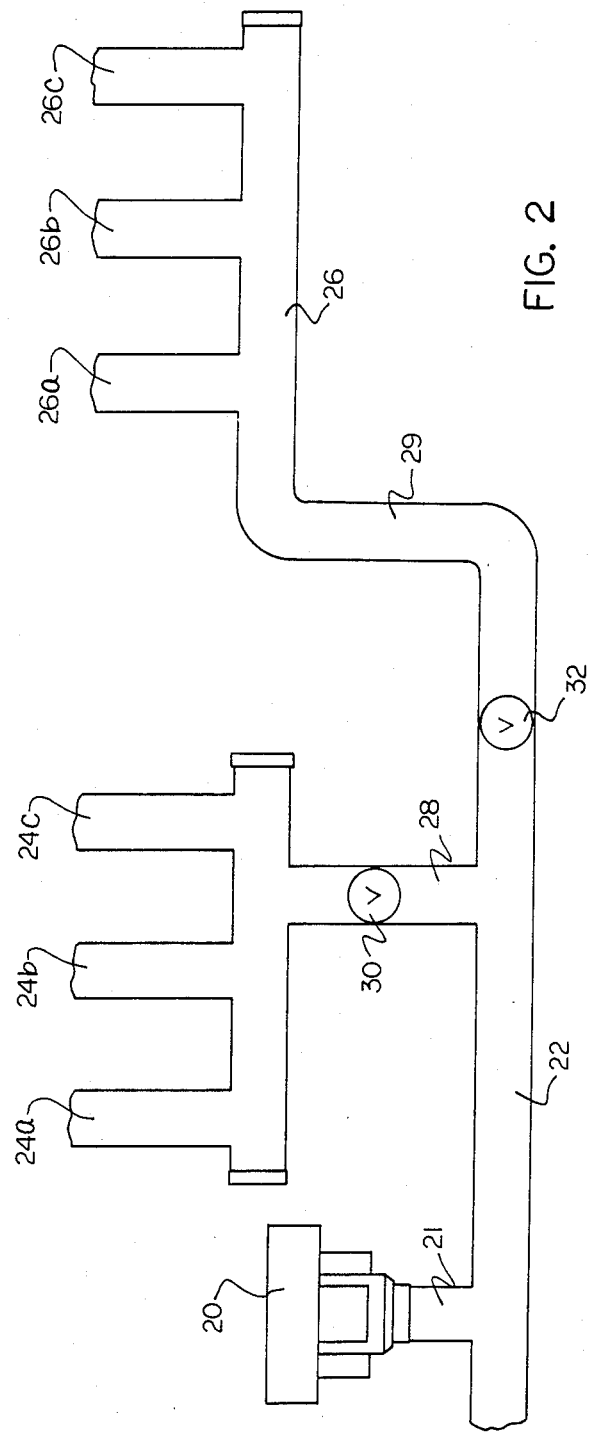

AIR TABLE WITH SELECTIVE AIR DISTRIBUTION

BACKGROUND AND SUMMARY OF THE PRESENT INVENTION

This invention relates to air tables and/or air conveyors, and more particularly to an air table in which a supply of air or a vacuum may be selectively supplied or applied to limited areas of the table in accordance with the needs of the operator.

Air tables are, in general, long work tables or surfaces formed of a plurality of modular sections arranged adjacent to each other in a linear path. The surface of the table is provided with a multiplicity of small holes through which air may pass either upwardly or downwardly. Generally a separate air plenum or chamber is provided beneath each section in which there is established either a positive air pressure or a vacuum. If the air pressure is positive, the air flows upwardly through the multiplicity of holes in the surface to provide an air cushion or support cushion for items placed thereon. This permits the items to be moved around the table more easily as the air supports the load minimizing the friction between load and the table surface, tending to make the load easier to move. Conversely, when a vacuum is drawn on the chamber beneath the table, air is drawn downwardly through the holes in the surface, and tend to pull the items placed thereon more tightly against the table forming what is commonly referred to as an "air chuck".

One example of the environment in which this type of table is used is in a cutting and sewing textile operation. Layers of fabric are spread on a lay-up table, then moved beneath a cutting head so that a pattern may be cut through the multiple layers of fabric. When the fabric is being spread and when the fabric is being cut, it is desired that the fabric remain stationary, and therefore the vacuum concept illustrated above is utilized. When the pile of fabric is desired to be moved, the positive air pressure or air cushion concept described hereinabove is used. Such tables, in and of themselves, are not new and have been recognized for some time in the prior art (see U.S. Pat. No. 4,527,346 issued July, 9, 1985, to Schwartzhott).

At certain times, as when the fabric is being spread on one section of the table in preparation for a cutting operation, and the remainder of the table is not in use, or when a stack of fabric is being cut under the cutting head, and the remainder of the table is idle, it may be preferable that the air be delivered only to certain areas of the table. Examples of rather complicated apparatuses for sequentially delivering air through a continuous plenum to isolated sections of the work table are illustrated by U.S. Pat. Nos. 3,495,492; 3,598,006; and 3,765,289.

The prior art equipment shown and described in the patents referenced in the preceding paragraph are relatively complicated, and, in fact, are adapted to be activated sequentially by a camming device that moves along the table with the work tool. As the tool approaches an area of the table, valving devices are automatically opened to activate the air pressure thereunder. When the tool passes, the valves are deactivated to close off the passage of air thereinto. While this is an effective approach for high speed production situations in which the requirement for air pressure may be determined by the movement of a tool, this apparatus requires a continuous air plenum and is relatively expensive.

On the other hand, there are instances when it is desirable for an isolated area(s) of the table to be activated, and not in accordance with any preselected pattern. For example, if work is being carried on at a particular area or section of the table, it may be desirable to supply air to that selected area for minutes or hours at a time, and never supply air to other sections of the table. Further, it may be desirable to supply air continuously to one section of the table for long periods of time, during which long period of time it may be desirable to periodically or temporarily activate other sections of the table. It is therefore desirable to provide a work table at which all sections may be provided air at once, or at which a selected area, or areas, may be provided air sporadically while the air supply to other areas is interrupted.

Toward this end, the present invention is directed to an air table of the type described wherein each section is provided with a separate air plenum therebeneath and adjacent modules or sections are grouped into sets. One or more main trunk air lines extend lengthwise beneath the table. Each set of sections is supplied with a separate air manifold which is attached to the main trunk air line by a single branch line and connected to each section in the set by a separate feed line. Each branch line includes a manually operated on-off valve for selectively connecting and disconnecting the flow of air to the corresponding manifold and thus to the corresponding set of table sections, whereby selected areas of the air table may be selectively activated and deactivated with a flow of air separate from other areas.

It is therefore an object of the present invention to provide an air work table in which the air supply may be directed to selected areas of the table at the desires of the operator.

It is another object of the present invention to provide an air table of the type described in which modular sections of the work table are divided into groups or sets, each set being provided with its own manifold, selectively activated or deactivated from the main air trunk line separate from the other manifolds.

Other objects and a fuller understanding of the invention will become apparent from reading the following detailed description of the preferred embodiment along with the accompanying drawings in which:

BRIEF DESCRIPTION OF THE DRAWINGS

FIG. 2 is an air schematic diagram corresponding to the portion of the table shown in FIG. 1 and illustrative of the invention concept.

DETAILED DESCRIPTION OF A PREFERRED EMBODIMENT

Figure 1:
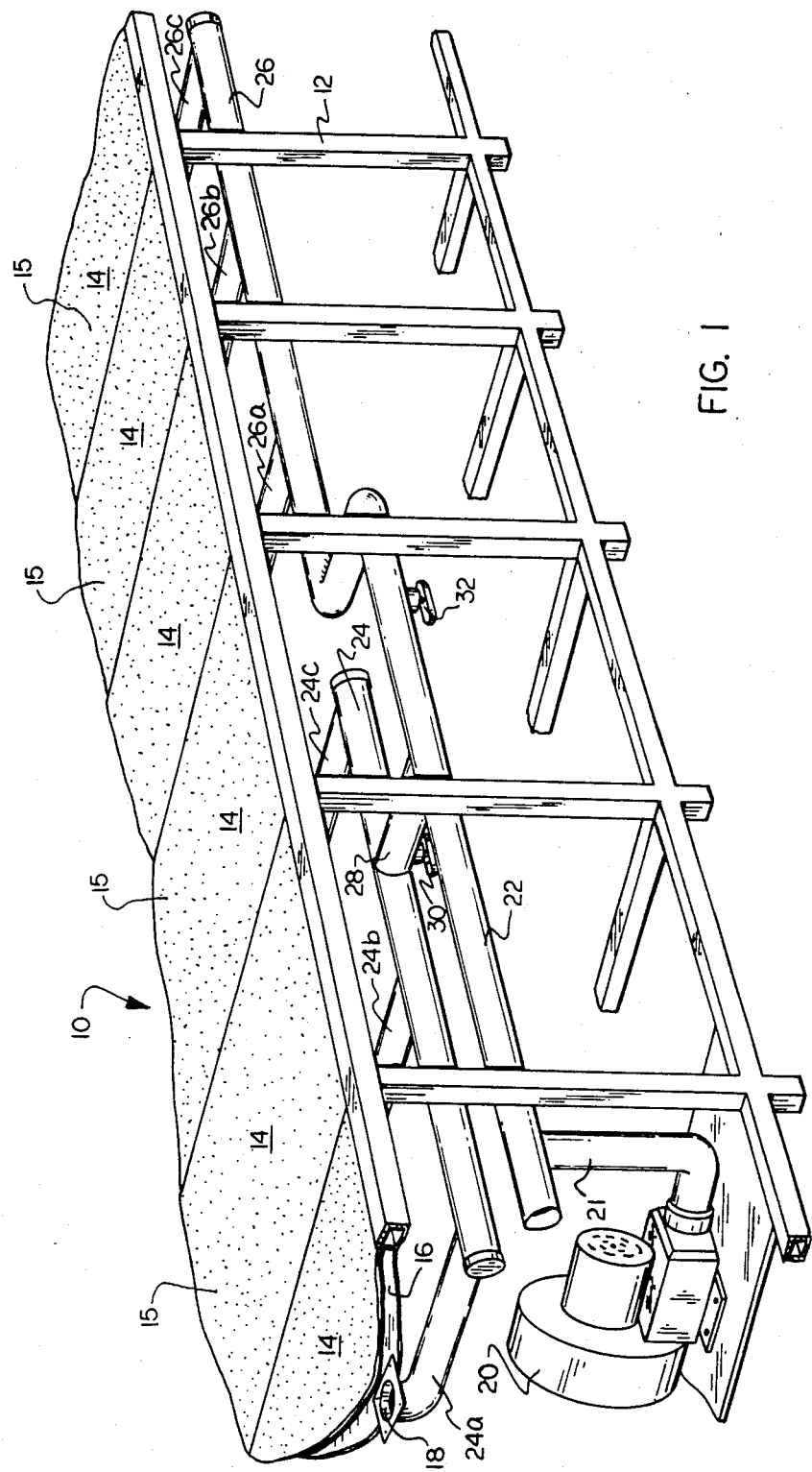
FIG. 1 is a perspective view of a portion of the air table according to the present invention.

Turning now to the drawings, there is illustrated in FIG. 1 a portion of an elongated air table or conveyor 10 which includes a frame 12 supporting a plurality of modular surface sections 14. Each surface section 14 includes a multiplicity of tiny holes 15 in the surface thereof through which air passes from or to a plenum chamber 16 therebeneath. Air enters the bottom of the plenum chamber 16 through an inlet opening 18 therein from a source of air to be described hereinbelow. For purposes of illustration, only a portion of the air table 10 is illustrated, it being apparent that the table can extend in either direction for as great a distance as desired by adding additional sections 14. Many such work tables are constructed which extend forty to sixty feet or more. It should be kept in mind that each section 14 is provided with its separate plenum 16 to which air must be separately delivered. Consistent with the objects of the present invention, the modular sections 14 are combined in groups or sets of three, as best illustrated in the schematic representation of FIG. 2.

A blower 20, which serves the entire work table 10, is mounted to the framework 12 beneath the surface sections 14, preferably in a central location thereunder. The blower 20 is connected to a main trunk line 22 by one or more connecting conduits 21. The main trunk line 22 extends substantially the length of the table and provides a pressurized trunk of air substantially the length thereof.

As stated hereinabove, the sections 14 are divided into a plurality of sets, each set preferably containing three sections 14 and the corresponding plenums 16. A manifold 24, 26 is provided for each set of sections 14. A separate air feed line 24a, 24b, 24c, 26a, 26b, and 26c connects the manifolds 24, 26 to the plenum 16 of the corresponding section 14.

A branch line 28 connects the main trunk 22 to manifold 24, and similarly a branch line 29 connects the trunk 22 to manifold 26. An on-off valve 30 in branch 28 controls the flow of air to manifold 24. Likewise, an on-off valve 32 downstream of branch 28 controls the flow of air to manifold 26. In the illustrated embodiment, there are two manifolds on the right-hand side of blower 20, and while not illustrated, the set-up would obviously have two manifolds (not shown) on the left-hand side of blower 20. This would serve a 48-foot table. The table may be longer, in which case there may be a third manifold on either side of blower 20 serving three additional sections on each side thereof. In such case, the two upstream manifolds on each side of blowers 20 would be constructed like manifold 24 with branch 28 and valve 30. The terminal manifold on each side of the blower would be constructed as illustrated by manifold 26 with branch 29. Note that in the outermost manifold, the valve 32 is not necessarily in branch 29, it only being necessary that valve 32 be positioned downstream of the preceding branch 28.

The arrangement illustrated in FIGS. 1 and 2 permit an operator to selectively deliver air to any prescribed set of sections 14, to a plurality of sets of sections, or to all sections. With all valves 30, 32 open, air is delivered to all sections. Obviously, when a selected valve is shut off, the manifold that it serves is deactivated.

Further, blower 20 may provide a positive air pressure within the plenums 16, or when reversed, a vacuum may be drawn in plenums 16 to form an air chuck thereabove. Thus, the system can be used either as a air cushion or an air chuck.

While a preferred embodiment of the invention has been described hereinabove, it is apparent that various changes and modifications might be made without the departing from scope of the invention which is set forth in the accompanying claims.

What is claimed is:

1. An air table comprising:
   (a) a support frame;
   (b) a plurality of modules arranged adjacent each other along the upper portion of said frame, each module including an upper surface having a multiplicity of perforations or openings therein, side walls, and a bottom wall forming an enclosed air plenum therebetween, said bottom wall having an air inlet therein for the introduction of air into said plenum;
   (c) a reversible air blower mounted on said frame beneath said modules;
   (d) a main air trunk extending from said blower lengthwise of the table;
   (e) a plurality of air manifolds attached to and extending longitudinally of said frame, parallel to said main air trunk, each of said air manifolds being shorter in length than said main air trunk and providing air for a plurality of said modules grouped together in a set, each of said manifolds being in close proximity to and serving one of said sets of modules, a plurality of air feed lines extending from each of said manifolds transversely across said frame beneath one of said modules, each of said air feed lines connecting said air inlet in the bottom wall of one of said plenums with the corresponding manifold;
   (f) a transversely extending branch line means connecting said main air trunk with each of said air manifolds for delivering air from said main air trunk to pressurize each of said air manifolds;
   (g) an on-off valve upstream of each manifold and between the corresponding manifold and the main air trunk serving the other manifolds for selectively connecting and disconnecting the flow of air thereinto;
   (h) whereby sets of modules in said air table may be selectively activated and deactivated with a flow of air separate from other of said sets of sections.

2. The air table according to claim 1 wherein each of said sets of modules comprises three adjacent modules, each module being served by a single manifold and three separate feed lines.

* * * * *